May 12, 1953 — J. W. ORENDORFF — 2,637,964
BEET HARVESTER HAVING BEET CLEANING MEANS
Filed Oct. 22, 1947 — 3 Sheets-Sheet 1

INVENTOR.
John W. Orendorff

May 12, 1953 J. W. ORENDORFF 2,637,964
BEET HARVESTER HAVING BEET CLEANING MEANS
Filed Oct. 22, 1947 3 Sheets-Sheet 2

INVENTOR.
John W. Orendorff
BY Paul O. Pippel
Atty.

May 12, 1953   J. W. ORENDORFF   2,637,964
BEET HARVESTER HAVING BEET CLEANING MEANS
Filed Oct. 22, 1947   3 Sheets-Sheet 3

INVENTOR.
John W. Orendorff
BY
Paul O. Pippel
Atty.

Patented May 12, 1953

2,637,964

UNITED STATES PATENT OFFICE 2,637,964

BEET HARVESTER HAVING BEET CLEANING MEANS

John W. Orendorff, Canton, Ill., assignor to International Harvester Company, a corporation of New Jersey Application October 22, 1947, Serial No. 781,449

5 Claims. (Cl. 55—107)

1

This invention relates to agricultural implements and particularly to a harvester for beets or the like.

An object of the invention is to provide a harvester for beets or the like incorporating improved means for disposing of the beet foliage and removing dirt which clings to the beets upon their withdrawal from the soil.

Another object of the invention is to provide a harvesting organization for beets and the like wherein provision is made not only for removing the beets from the soil and topping and cleaning them so that they may be delivered to their destination with a minimum of dirt and foreign matter adhering thereto, but likewise for disposing of the beet foliage or tops in such a way that they may be easily gathered and preserved as food for livestock.

Another object of the invention is to provide in combination with conveying mechanism for beets and the like, means for dislodging dirt adhering thereto.

A further object of the invention is to provide for use with a beet harvester or the like a conveyor floatingly carried by the vehicle upon which it is mounted in such a way that the receiving end thereof may rise and fall with changes in surface contour of the ground.

Other objects and advantages will become apparent from the following detailed description when read in conjunction with the accompanying drawings wherein.

Figure 1:
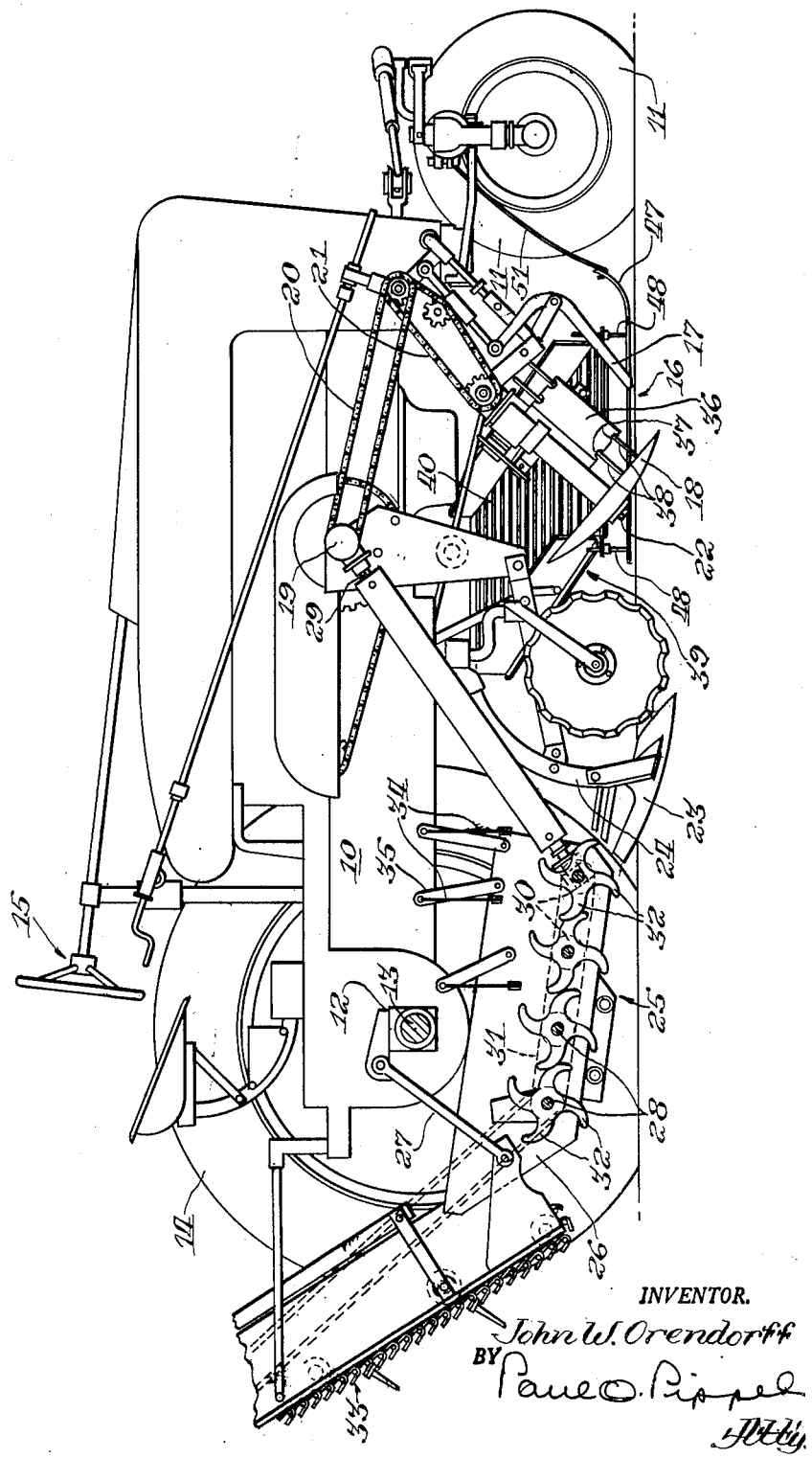
Fig. 1 is a view in side elevation of a tractor-mounted beet harvester embodying the features of the present invention with the near wheel removed and with parts shown in section.

Referring to the drawings, the numeral 10 designates the longitudinally extending body of a tractor having front wheels 11, transverse rear axle structures 12 extending laterally from opposite sides of the tractor body and an axle 13 journaled therein. Axle 13 has mounted thereupon drive wheels 14. The tractor is likewise provided with a steering mechanism 15.

It may be noted that the beet harvester includes in longitudinal alinement and mounted upon the side of the tractor body between the latter and the plane of one of the drive wheels,

2 a topping unit generally indicated at 16 adapted to remove the crown and foliage from the beets and comprising generally a feeler gauge 17 adapted to engage the beet and to rise and fall with the variations in height of beets encountered. This feeler gauge 17 is a part of the topping unit and is mounted upon the side of the tractor at the front thereof along with a circular cutting blade or disk 18. The topping unit 16 is mounted for vertical floating movement with respect to the tractor and may be raised and lowered between transport and operating positions by lifting mechanism, not shown, under the control of the tractor operator from his station thereon. The cutting blade 18 is rotatably mounted and is suitably driven in a manner such as is described in the above mentioned patent application. Drive is taken from a tractor power take-off shaft 19 and transmitted by way of chain drives 20 and 21 to the shaft 22 upon which the disk 18 is mounted.

Also mounted upon the side of the tractor rearwardly of the topping unit 16 are the digger blades 23 carried at the lower ends of standards 24. These blades 23 penetrate the earth and withdraw the beets therefrom. These blades 23 converge rearwardly and the rear ends thereof are above the surface of the ground. Beets received between the blades 23 are carried rearwardly therebetween and delivered to a combination agitator and conveyor mechanism indicated at 25.

The conveyor 25 comprises laterally spaced longitudinally extending plates 26 suspended from the tractor body by one or more straps 27. Longitudinally spaced shafts 28 are mounted between the plates 26. The forwardmost shaft 28 is drivingly connected to the power take-off shaft 19 of the tractor through a shaft 29 and suitable conventional driving mechanism. The forwardmost shaft 28 is thus driven by tractor power and this power is transmitted through sprockets 30 and chains 31 to the remaining shafts 28. These shafts are rotated in an anti-clockwise direction as viewed in Fig. 1 and, between the plates 26, each of the shafts is provided with a plurality of fingers 32 extending radially therefrom. These fingers interweave and beets received thereupon are struck by the fingers and impelled rearwardly. After passing over the conveyor 25 the beets are received upon an elevator 33 for delivery to a receptacle or the like for storage of the beets.

Figure 2:
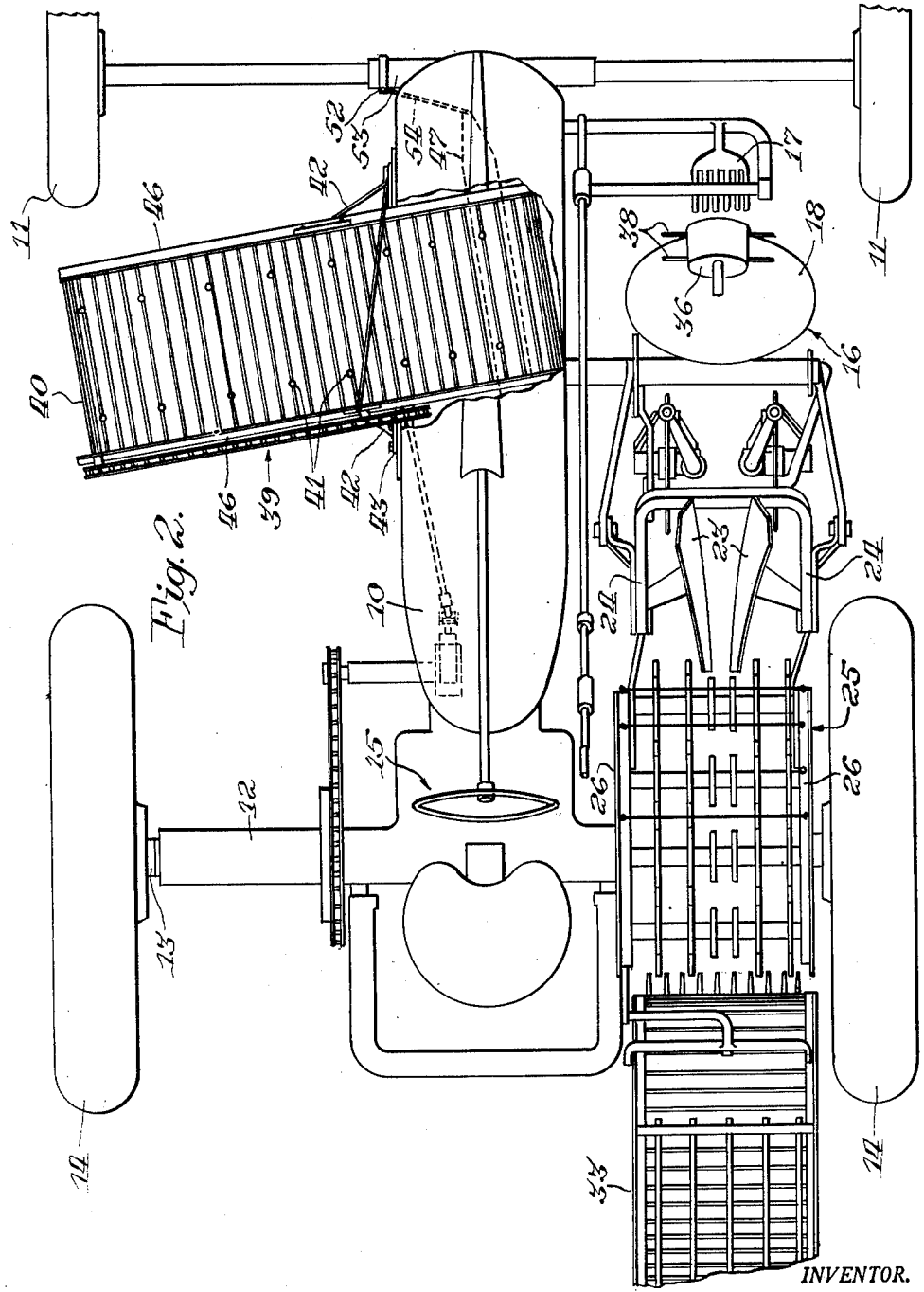
Fig. 2 is a plan view of the structure shown in Fig. 1.
Figure 3:
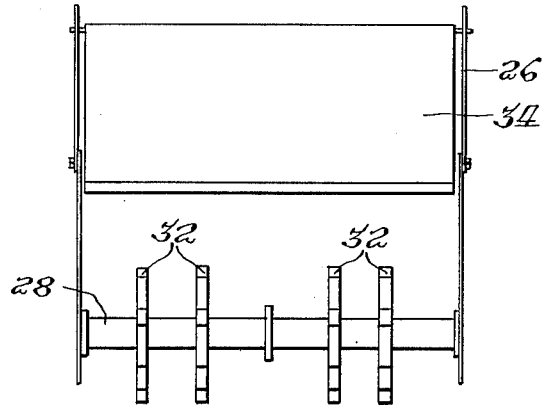
Fig. 3 is an enlarged detail of the combined agitating and conveying mechanism for the beets.
Figure 4:
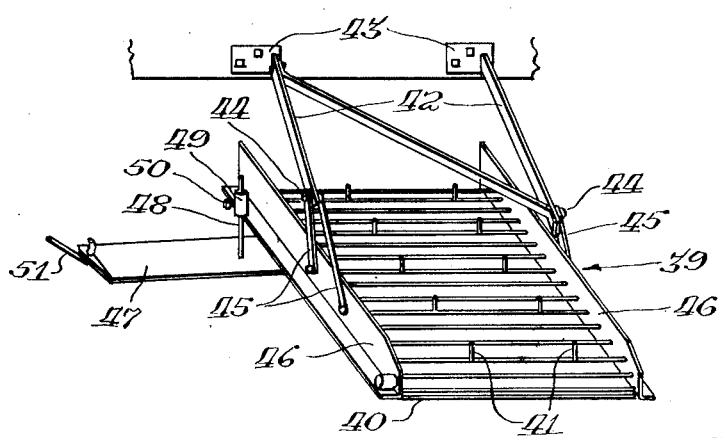
Fig. 4 is a view in perspective of the conveyor for the beet tops.

It is of great importance that the foreign matter in a load of freshly harvested beets be kept at a minimum. Therefore, the present invention contemplates the provision of means for dislodging dirt adhering to the beets after they are removed from the soil. For this purpose there is associated with the conveyor 25 a number of pendulous curtains 34 of flexible material suspended between pairs of uprights 35 secured to the plates 26. Three of these curtains are provided in longitudinally spaced relation as clearly shown in Figs. 1 and 2. Fig. 3 shows the forward end of the conveyor 25 in elevation and the relationship of the forwardmost curtain to the fingers 32. Beets carried upon the conveyor 25 from the digger blades 23 are knocked against these curtains 34 in their passage rearwardly to the elevator 33. These curtains serve a dual function of retarding the beets and assuring their delivery to the elevator 33, and of dislodging dirt adhering to the beets.

While the dirt is being dislodged from the beets by the combination agitator and conveyor 25 and the curtains 34, the beet tops are being taken care of and deposited for future collection by mechanism now to be described. Associated with the cutting disk 18 is a so-called flinger drum 36 having peripheral openings 37 therein for the projection therethrough of fingers 38. This flinger is driven by suitable mechanism described in a copending application. It may be noted here that the drive for the flinger drum 36 is taken from the same power take-off shaft 19 from which the cutter disk 18 is driven and the drum is rotated in a direction to catch the crown and tops severed from the beets by the blade 18 and to divert or discharge them laterally beneath the tractor toward the opposite side thereof.

The tops discharged by the flinger 36 are received upon the lower end of a conveyor 39 which extends from a location beneath the tractor in a position to receive the tops discharged from the disks 18 laterally upwardly and rearwardly of the direction of travel of the tractor. As shown in Figure 2, this conveyor 39 extends generally transversely of the machine at an angle less than a right angle to the line of advance thereof and to a location substantially laterally outwardly of the plane of the left-hand rear drive wheel 14. The structure of the endless chain mechanism 40 of the conveyor 39 is conventional. The chain is of a type that will catch the beet tops as they are discharged from the flinger and radially projecting pins 41 are provided at spaced locations therealong to assist in holding the tops as they are conveyed laterally away from the tractor during its travel down the field.

The conveyor 39 is mounted upon the opposite side of the tractor from the topping unit 10 and is suspended from the side of the tractor by straps 42 secured to plates 43 affixed to the side of the tractor. The outer end of each of the straps 42 is pivotally connected at 44 to a pair of links 45, the lower ends of which are connected to the spaced side frames 46 of the conveyor 39. The conveyor 39 is thus capable of vertical floating movement by virtue of the pivotal connection thereof to the straps 42.

As shown in Fig. 2, the conveyor 39 extends upwardly and outwardly to a location permitting the dumping of beet tops beyond the confines of the tractor wheels and the laterally inner end of the conveyor extends to a location adjacent the topping unit 16 in a position to receive beet tops discharged therefrom by the flinger drum 36. In order that the lower end of the conveyor 39 may follow the contour of the ground over which the tractor is traveling, an elongated longitudinally extending ground engaging shoe 47 is provided and adjustably secured to the frame members 46 of the conveyor by one or more bolts 48. Each bolt 48 is slidably received in a sleeve 49 secured to the frame 46 and the bolt is held in adjusted position therein by means of a setscrew 50. The shoe 47 extends below the inner end of the elevator 39 and the forwardly projecting end thereof is pivotally connected by a link 51 with a lug 52 carried on the front axle structure 53 of the tractor.

Beets harvested by the harvester organization herein described may be delivered to a receptacle for storage or to a vehicle for transport with a minimum inclusion of dirt and other foreign matter. This is due to the combined action of the agitating conveyor 25 and the curtains 34 associated therewith adapted to frictionally engage and retard the beets delivered thereto from the digger blades and to dislodge dirt therefrom. Dirt dislodged from the beets carried over the conveyor 25 falls through the spaces between the fingers 32 and is returned to the ground from which it was taken. At the same time the beet tops removed by cutting disks 18 are preserved against crushing by the harvesting mechanism or the tractor wheels and are delivered to a location laterally of a vertical plane extending through the left-hand tractor drive wheels. If desired, of course, a receptacle or other vehicle may be provided to receive the tops discharged from the conveyor 39.

The invention has been described in its preferred embodiment only and it should be understood that modifications may be made therein without departing from the spirit thereof. Therefore, it is desired that the invention be limited only by the scope of the appended claims.

What is claimed is:

1. In a tractor mounted harvester for beets and the like wherein cutting mechanism for severing the foliage from the beets and digging mechanism for removing the beets from the soil are provided, a conveyor mounted on the side of the tractor rearwardly of the digging mechanism to receive the beets therefrom and convey them rearwardly, and means serving as a pendulous, flexible curtain associated with said conveyor transversely thereof, said curtain terminating above and out of engagement with the conveyor and extending vertically in the path of the beets to engage and retard the latter and remove dirt adhering thereto.

2. In a tractor mounted harvester for beets and the like wherein cutting mechanism for severing the foliage from the beets and digging mechanism for removing the beets from the soil are provided, a conveyor mounted on the tractor in a position to receive and convey beets withdrawn from the soil by the digging mechanism, and at least one freely swinging obstruction substantially perpendicular to and in the path of the beets moved by the conveyor, said obstruction terminating above and out of engagement with the conveyor and adapted to engage the beets and retard their movement but yieldable to accommodate passage of the beets on the conveyor.

3. In a tractor mounted harvester for beets and the like wherein cutting mechanism for severing the foliage from the beets and digging mechanism for removing the beets from the soil are provided, a conveyor mounted on the tractor in a position to receive and convey beets withdrawn from the soil by the digging mechanism, and a plurality of swinging, pendent, flexible curtain like members arranged transversely along the conveyor substantially perpendicular thereto and terminating thereabove and adapted to successively engage the beets in their passage over the conveyor.

4. In a tractor mounted harvester for beets and the like wherein cutting mechanism for severing the foliage from the beets and digging mechanism for removing the beets from the soil are provided, a conveyor mounted on the tractor in a position to receive and convey beets withdrawn from the soil by the digging mechanism, and a plurality of flexible curtain like members pivotally suspended above and transversely of the conveyor and terminating thereabove for swinging longitudinally of the conveyor on a transverse axis and arranged at spaced locations along the conveyor to engage the beets and retard them in their passage.

5. In harvesting mechanism for beets and the like wherein freshly dug beets are treated to remove dirt and trash adhering thereto, a conveyor in the form of a plurality of parallel rotatable shafts having radially projecting fingers forming a surface for the reception of beets delivered thereto, the fingers on successive of said rollers being adapted upon engagement with a beet to impart impetus thereto in the direction of rotation of the shafts, and at least one flexible obstruction suspended and terminating above the conveyor for free swinging longitudinally thereof in the path of the beets arranged to momentarily check the impetus of the beets in their path of travel but yieldable to permit the passage thereof along the conveyor.

JOHN W. ORENDORFF.

References Cited in the file of this patent

UNITED STATES PATENTS

| Number | Name | Date |
|---|---|---|
| 765,090 | Lesh | July 12, 1904 |
| 984,795 | Briggs | Feb. 21, 1911 |
| 1,046,550 | Briggs | Dec. 10, 1912 |
| 1,140,847 | Pederson et al. | May 25, 1915 |
| 1,232,086 | Redding | July 3, 1917 |
| 1,289,577 | Tollefson | Dec. 31, 1918 |
| 1,519,632 | Sayen | Dec. 16, 1924 |
| 1,568,810 | Djuberg | Jan. 5, 1926 |
| 1,596,830 | Haase | Aug. 17, 1926 |
| 1,748,746 | Zuckerman | Feb. 25, 1930 |
| 1,837,753 | Berry | Dec. 22, 1931 |
| 1,878,349 | Terada | Sept. 20, 1932 |
| 1,899,292 | Rienks | Feb. 28, 1933 |
| 2,141,493 | Tallman | Dec. 27, 1938 |

FOREIGN PATENTS

| Number | Country | Date |
|---|---|---|
| 28,537 | Denmark | Sept. 26, 1921 |
| 40,792 | Denmark | Sept. 16, 1929 |